Patented Feb. 3, 1942

2,272,039

UNITED STATES PATENT OFFICE 2,272,039

REFRACTORY COMPOSITION

John D. Morgan, South Orange, N. J., assignor to Cities Service Oil Company, New York, N. Y., a corporation of Pennsylvania No Drawing. Application July 20, 1938, Serial No. 220,268

2 Claims. (Cl. 106—57)

The present invention relates to refractories, and more particularly to an improved high thermal conductivity silicon containing refractory.

The present invention is an improvement on the refractory disclosed in the patent to J. D. Morgan and R. E. Lowe, No. 2,061,099.

The use of fused materials as one of the starting ingredients for high thermal conductivity refractories is known to be very desirable.

The primary object of the present invention is the production of a high thermal conductivity refractory material.

Another object of the invention is the production of a refractory possessing great strength as well as high electrical resistance.

According to the present invention, electrically fused materials such as alumina ($Al_2O_3$), silicon carbide (SiC), zirconia ($Zr_2O_3$) and chromium oxide ($Cr_2O_3$) are mixed with finely ground metallic silicon or ferrosilicon, aluminum silicates of the type of sillimanite, andalusite, and cyanite, phosphoric acid and chromic acid, and the resulting mixture (wet) treated at certain preferred temperatures to yield the desired refractory.

The improvement provided by the present invention will be best understood by the following more detailed description of the improved refractory and the process for its manufacture. As a specific example, a creamy paste is made of the following materials:

50 parts of 75% ferrosilicon through an 80 mesh and on a 300 mesh screen;

20 parts of fused chromium oxide through a 20 mesh screen;

29 parts of milled sillimanite through a 300 mesh screen;

6 cc. of 85% orthophosphoric acid per 100 grams of the above mixture; and 2 cc. of chromic acid per 100 grams of the above mixture.

Before certain of these materials are placed in the mixture, they are preferably prepared as follows:

The sillimanite (an aluminum silicate) is milled so that most of it will pass through a 300 mesh screen. The ferrosilicon is ground so that it will all pass through an 80 mesh screen and not pass through a 300 mesh screen. The chromium oxide is electrically fused and ground to pass through a 20 mesh screen. Instead of using fused chromium oxide other fused material such as silicon carbide, zirconia, and alumina, may be used.

The mixture is digested and dried down at a temperature in the neighborhood of boiling water. The drying is carried on until the proper consistency is reached, either for molding, casting, hand ramming or hydraulic pressing.

The mixture is cast or pressed into the various shapes required and dried at a gradually increasing temperature until a final temperature of about 600° F. is reached, at which temperature the shapes are hard enough to be handled. The 600° treated shapes may be stored and then may later be finished by firing to any suitable temperature up to about 2700° F.

It is contemplated that various modifications of the above process may be made without departing from the spirit and scope of the invention. A satisfactory bond can be secured, though the amount of phosphoric acid used in the mixture varies from 1% to 10% by weight of the mixture. Likewise the amount of chromic acid used in the mixture can be in the range of from .5 to 5%. While chromic acid is preferably used, it can be completely omitted from the mixture because the phosphoric acid alone is an effective bonding agent.

The proportions of other ingredients may also be varied, as for example the metallic portion of the mixture either in the form of silicon or ferrosilicon, can be increased up to 80% of the total mixture. Likewise the proportions of the fused materials and the proportions of aluminum silicates can be varied through comparatively wide ranges.

As the electrically fused materials mentioned herein have certain properties in common, they may be interchangeably used in the process of manufacturing the refractories claimed. However, they also have certain individual differences giving to one refractory superiority in one field, and to another superiority in another field.

Having thus described the invention, what is claimed as new is:

1. A composition comprising sillimanite, silicon and a fused refractory from the group consisting of alumina, zirconia and chromium oxide, said materials being bonded together by the reaction products resulting from the action thereon of 1%–10% by weight of phosphoric acid and .5%–5% by weight of chromic acid.

2. A composition comprising approximately 29 parts by weight of an aluminum silicate, approximately 20 parts by weight of fused chromium oxide and approximately 50 parts by weight of ferrosilicon, said materials being bonded together by the reaction products resulting from the action thereon of approximately two parts by weight of chromic acid and about six parts by weight of phosphoric acid.

JOHN D. MORGAN.